United States Patent [19]

Serres et al.

[11] 4,434,270
[45] Feb. 28, 1984

[54] ETHYLENE/PROPYLENE/VINYL ALKYL KETONE POLYMERS

[75] Inventors: Carl Serres, Naperville; John G. Schaffhausen, Aurora, both of Ill.

[73] Assignee: Standard Oil Company (Indiana), Chicago, Ill.

[21] Appl. No.: 447,447

[22] Filed: Dec. 6, 1982

[51] Int. Cl.³ .................. C10M 3/12; C08F 210/06; C08F 216.30

[52] U.S. Cl. .................. 524/570; 526/316; 252/52 R

[58] Field of Search .............. 526/316; 524/570; 252/52 R

[56] References Cited

U.S. PATENT DOCUMENTS

| | | | |
|---|---|---|---|
| 3,591,502 | 7/1971 | Ilnyckyj | 252/52 R |
| 3,687,849 | 8/1972 | Abbott | 252/52 R |
| 3,700,647 | 10/1972 | Nakaguchi et al. | 526/316 |
| 3,860,538 | 1/1975 | Guillet et al. | 526/316 |
| 3,875,134 | 4/1975 | Morikawa et al. | 526/316 |

OTHER PUBLICATIONS

Chem. Abstracts, vol. 74, entry 78116q, E. Seymour et al.

*Primary Examiner*—Joseph L. Schofer
*Assistant Examiner*—Peter F. Kulkosky
*Attorney, Agent, or Firm*—William H. Magidson; William T. McClain

[57] ABSTRACT

An amorphous, oil soluble ethylene/propylene/vinylalkyl ketone polymer having a mol ratio of ethylene to propylene from about 35:65 to 60:40 and lube oil compositions comprising said polymers.

16 Claims, No Drawings

ETHYLENE/PROPYLENE/VINYL ALKYL KETONE POLYMERS

This invention relates to amorphous, oil soluble ethylene/propylene/vinyl alkyl ketone polymers having a mol ratio of ethylene to propylene from about 35:65 to 60:40 and lube oil compositions comprising said polymers. More particularly, this invention relates to amorphous, oil soluble ethylene/propylene/vinyl alkyl ketone polymers having an inherent viscosity of about 0.6 to 1.1 wherein the mol ratio of ethylene to propylene ranges from about 35:65 to 60:40, and lube oil compositions containing these polymers.

High temperature, high speed engines currently in use in Europe and becoming more common in the United States require multigrade oils that prevent hot varnish/lacquer and retain their viscosity after extended operation. (Generally the European Market desires a Bosch Shear Stability Index under 30 while the U.S. Market desires a Bosch Shear Stability Index under 45.) These two properties are not generally found in the same additive. For example, ethylene/propylene and hydrogenated diene polymers can possess high shear stability (Low Shear Stability Index) but offer little protection against deposit formation. Styrene copolymers, polyimides, and polymethacrylates are effective against deposits but are rapidly degraded during engine operation. While ethylene/propylene rubbers are a preferred base for shear stable viscosity index improvers primarily because of low cost and ready availability, ethylene/propylene rubbers require post-processing in order to achieve the desired shear stability. Shear stability of ethylene/propylene rubbers is obtained by mechanical shearing or thermo-oxidative shearing. The former process has the disadvantage that it is costly both in terms of capital investment and low throughput while the latter requires special base stocks and additional processing time. Accordingly, there is a need for shear stable viscosity index improvers based on ethylene/propylene polymers where no post-processing of the polymer is necessary to achieve the desired high shear stability.

For purposes of this invention, inherent viscosity was measured using 0.4 g/100 ml toluene at 30° C.

The general object of this invention is to provide a new class of shear stable viscosity index improvers. Other objects appear hereinafter.

We have now found that random, amorphous, oil soluble ethylene/propylene/vinyl alkyl ketone polymers having an inherent viscosity (I.V.) of about 0.6 to 1.1, preferably 0.7 to 1.0, are excellent shear stable viscosity index improvers. The inherent viscosity of these polymers is primarily dependent on the vinyl alkyl ketone content of the polymer since the vinyl alkyl ketone is a poison for the catalysts used to prepare the polymers. As the vinyl alkyl ketone content increases, the inherent viscosity decreases. If the I.V. is above 1.1, and a vinyl alkyl ketone is the sole source of carbonyl groups, shear stability is too low and thickening power is high. The polymers of this invention have a mol ratio of ethylene to propylene from about 35:65 to 60:40, i.e., the weight ratio of propylene to ethylene is at least 1. If the weight ratio of ethylene to propylene is above 1, the oil solubility of the polymer is reduced at low temperatures and there is a tendency for the polymer to come out of the lube oil composition. On the other hand, as the concentration of propylene increases to above about 65 mol percent, the shear stability of the polymer decreases. It is essential that the polymers of this invention are random, amorphous and oil soluble. As is well known, ordered crystalline polymers are not oil soluble and cannot function as lube oil additives.

While some references disclose ethylene, vinyl alkyl ketone polymers and the possibility of using other comonomers in place of or together with ethylene, none of these references disclose nor suggest polymers wherein propylene comprises at least 50% by weight of the ethylene and propylene comonomers. For example, while U.S. Pat. No. 3,591,502 of Ilnyckyj discloses ethylene/vinyl alkyl ketone polymers which can contain minor amounts by weight of comonomers, it does not disclose propylene. U.S. Pat. Nos. 3,984,388 of Shryne et al; 3,689,460 of Nozaki; 3,694,412 of Nozaki; and 3,835,123 of Nozaki which are incorporated by reference, disclose olefinic/CO polymers, preferably mono olefins of 2 to 8 carbon atoms and most preferably ethylene, where the olefinic monomer can include vinyl alkyl ketone. However, there is no appreciation in any of these patents that the propylene/ethylene weight ratio should be at least 1 as required in the instant invention.

Briefly, the amorphous, oil soluble ethylene/propylene/vinyl alkyl ketone polymers of this invention can be prepared by polymerizing ethylene, propylene and vinyl alkyl ketone using a catalyst system comprising an aluminum alkyl and a vanadium halide, oxyhalide or oxyalkoxide. This catalyst combination assures the formation of an amorphous, random, oil soluble polymer. As is well known, free radical catalysts are not suitable for polymerizing propylene to a high molecular weight polymer.

Suitable vinyl alkyl ketones contain 1 to 8 carbon atoms in the alkyl group such as methyl vinyl ketone, ethyl vinyl ketone, octyl vinyl ketone, etc.

As indicated above, the mol ratio of ethylene to propylene ranges from about 35:65 to 60:40. In order to obtain a polymer having an inherent viscosity of about 0.6 to 1.1, preferably 0.7 to 1.0, the ethylene/propylene are copolymerized with approximately 0.1 to 15 parts by weight vinyl alkyl ketone per 100 parts by weight ethylene/propylene, preferably 0.3 to 5 parts by weight per 100 parts by weight ethylene/propylene. Approximately half of the vinyl alkyl ketone appears to react with the catalyst and poison same and approximately half is incorporated into the ethylene/propylene copolymer. In other words, the resultant ethylene/propylene/vinyl alkyl ketone copolymer typically contains from about 0.05 to 7.5 parts by weight vinyl alkyl ketone moieties, preferably 0.15 to 2.5, per 100 parts by weight of ethylene/propylene.

If desired up to 20 mole percent of other copolymerizable monomers per total moles of ethylene and propylene can be used. Suitable other comonomers, including mono olefins containing from 4 to 20 carbon atoms, such as 1-butene, 1-hexene, 4-methyl-1-pentene, 1-decene; monovinyl aromatics, such as styrene; diolefins containing from about 4 to about 25 carbon atoms, such as 1,3-butadiene, 1,4-hexadiene, 1,4-pentadiene, 2-methyl-1,5-hexadiene, 1,7-octadiene, 4-methylene-2-norbornene, norbornadiene, etc.

The monomers can be polymerized under conventional conditions, such as slurry, mass or vapor phase, as is common in the olefin polymerization arts.

Polymerization readily occurs at temperatures ranging from about 10° C. to 200° C. as is common in the olefin polymerization art.

After the polymerization reaction is complete, the catalyst composition can be inactivated by the addition thereto of a suitable quenching agent as, for example, water or an alcohol such as isopropanol. The polymer formed by the reaction can then be separated from the reaction mixture by conventional procedures well known in the art. Catalyst residues can be removed from the polymer by washing with suitable solvents, such as, for example, water, or an alcohol such as isopropanol. Removal of catalyst residues in some cases is facilitated by diluting the polymerizate with tetrahydrofuran or tetrahydrofuran and ashless wood pulp before washing.

The substantially metal free amorphous, ethylene/propylene/vinyl alkyl ketone polymers of the present invention are effective shear stable, viscosity index improving additives in lubricant compositions when used in amounts from about 0.1 to about 10 percent neat copolymer.

Suitable lubricating base oils are mineral oils, petroleum oils, synthetic lubricating oils such as those obtained by the polymerization of hydrocarbons, and other well known synthetic lubricating oils, and lubricating oils of animal or vegetable origin. Concentrates (major proportion base oil and minor proportion additive of this invention) of a suitable oil base containing more than 10 percent, that is of about 10 wt. % alone or in combination with other well known additives, can be used for blending with the lubricant oils in proportions desired for particular conditions or used to give finished products containing from about 0.1 to about 10% of additives of this invention.

While this invention is primarily directed to amorphous, oil soluble ethylene/propylene/vinyl alkyl ketone polymers having an inherent viscosity of about 0.6 to 1.1, amorphous, oil soluble ethylene/propylene/vinyl alkyl ketone polymers having an I.V. of from about 0.1 to 2 can be used advantageously in lube oil compositions. For example, additives having I.V. of from about 0.1 to about 0.6 can be used as flow improvers whereas those having an I.V. of from 1.1 to 2.0 can be used in those cases where shear stability is not required and in some cases where, in fact, low shear stability is preferred. Lower I.V. polymers (e.g. 0.4 to 1.1 inherent viscosity) are preferred for the preparation of the dispersant, viscosity index improver referred to below.

Any of the polymers described in this invention can be converted to highly dispersant, viscosity index improvers by reacting the amorphous, oil soluble ethylene/propylene/vinyl alkyl ketone polymers under Mannich condensation conditions with a formaldehyde yielding reagent and amine. These products are the subject of our Ser. No. 447,446 filed on even date and is hereby incorporated by reference.

EXAMPLE I

Gaseous ethylene and propylene were each added at a rate of 20 liters per hour to a 2 liter resin kettle containing 1 liter of hexane at about 25° C. Separate streams of 17.5 grams ethyl aluminum dichloride in 130 ml hexane and 0.5 ml of vanadium oxide triethoxide in 150 ml hexane were added continuously to the reaction solution dropwise. Polymerization started immediately and a solution of 5 ml vinyl methyl ketone in 500 ml hexane was added dropwise in a continuous manner. The rate of catalyst addition was adjusted so that there was essentially no unreacted olefin off-gas. All of the vinyl methyl ketone addition was completed in 2½ hours while the polymerization temperature was maintained at 25° C. by external cooling.

The polymer was recovered by adding the polymerizate to 8 liters of methanol containing 60 ml of concentrated hydrochloric acid resulting in the precipitation of 145 grams of crude ethylene/propylene/methyl vinyl ketone polymer. The product was washed with methanol and dried overnight in a vacuum oven at 50° C. One hundred thirty grams of polymer was recovered having an inherent viscosity of 0.89 (0.4 grams/100 ml in toluene at 30° C.). The product was redissolved in 2.5 liters toluene, filtered and precipitated in methanol yielding a polymer having an I.V. of 0.95. Infrared analysis indicated that the polymer had 0.62% by weight of methyl vinyl ketone moieties and 13C NMR indicated a 56/44 mole ratio of ethylene to propylene.

EXAMPLE II

An ethylene/propylene/methyl vinyl ketone polymer having an inherent viscosity of 1.1 was prepared by the method of Example I except that 3 ml methyl vinyl ketone in hexane was added.

EXAMPLE III

An ethylene/propylene/methyl vinyl ketone polymer was prepared by the method of Example I having an inherent viscosity of 0.7 except that 10 ml methyl vinyl ketone in hexane was added.

EXAMPLE IV

The Bosch shear stability of the polymers of Example I to III were determined:

|  | Inherent Viscosity | Bosch |
|---|---|---|
| Example I | .95 | 38.2 |
| Example II | 1.1 | 47.1 |
| Example III | .7 | 24.7 |

The above data indicates that shear stable viscosity index improvers can be prepared from ethylene/propylene and alkyl vinyl ketone and that it is possible to produce polymer meeting the requirements of the U.S. and European markets.

We claim:

1. An amorphous, oil soluble random ethylene/propylene/vinyl alkyl ketone polymer having a mol ratio of ethylene to propylene from about 35:65 to 60:40 with up to 15 parts by weight vinyl alkyl ketone per 100 parts by weight ethylene/propylene and wherein said polymer has an inherent viscosity of from about 0.1 to 2".

2. The polymer of claim 1 wherein said polymer contains from about 0.05 to 7.5 parts by weight vinyl alkyl ketone moieties per 100 parts by weight ethylene and propylene.

3. The polymer of claim 2 wherein said polymer contains from about 0.15 to 2.5 parts by weight vinyl alkyl ketone moieties per 100 parts by weight ethylene and propylene.

4. The polymer of claim 3 wherein said vinyl alkyl ketone is methyl vinyl ketone.

5. The polymer of claim 1 wherein said polymer has an inherent viscosity of about 0.6 to 1.1.

6. The polymer of claim 5 wherein said polymer contains from about 0.05 to 7.5 parts by weight vinyl alkyl ketone moieties per 100 parts by weight ethylene and propylene.

7. The polymer of claim 6 wherein said polymer contains from about 0.15 to 2.5 parts by weight vinyl alkyl ketone moieties per 100 parts by weight ethylene and propylene.

8. The polymer of claim 7 wherein said vinyl alkyl ketone is methyl vinyl ketone.

9. A lubricating oil composition comprising a major portion of a base oil and a minor portion or the polymer of claim 1.

10. A lubricating oil composition comprising a major portion of a base oil and a minor portion of the polymer of claim 2.

11. A lubricating oil composition comprising a major portion of a base oil and a minor portion of the polymer of claim 3.

12. A lubricating oil composition comprising a major portion of a base oil and a minor portion of the polymer of claim 4.

13. A lubricating oil composition comprising a major portion of a base oil and a minor portion of the polymer of claim 5.

14. A lubricating oil composition comprising a major portion of a base oil and a minor portion of the polymer of claim 6.

15. A lubricating oil composition comprising a major portion of a base oil and a minor portion of the polymer of claim 7.

16. A lubricating oil composition comprising a major portion of a base oil and a minor portion of the polymer of claim 8.

* * * * *